United States Patent Office 3,033,782
Patented May 8, 1962

3,033,782
POLYMERIC AGGLOMERATING AGENTS
Harald K. Rauch, Klaus D. Tessmar, and Theodor G. Volker, Darmstadt, Germany, assignors to Rohm & Haas G.m.b.H., Darmstadt, Germany
No Drawing. Filed Jan. 28, 1958, Ser. No. 711,544
Claims priority, application Germany Jan. 28, 1957
6 Claims. (Cl. 210—54)

It is known that polyelectrolytes exhibit an agglomerating action. Use is made of this property, for example, in the improvement of the structure of soil or in the acceleration of sedimentation of finely divided substances in water. The possibilities of the use of copolymers of methacrylic acid for this purpose is described in German Patents Nos. 897,847, 927,444, 931,591, 941,671, 941,672, and 946,987.

It has now been found that the agglomerating effect of water-soluble linear macro-molecular compounds which may be in the form of their alkali metal or alkaline earth metal salts and whose molecules are constructed entirely or in part of methacrylic acid units and cyclized dimethacryloylimide units surpasses to an astounding extent the effect of the polyelectrolytes previously proposed for the same purpose. The amount of the methacrylic acid units in the macro-molecular compounds should be at least about 25 mol percent and the amount of the cyclized dimethacryloylimide units in the compounds should be at least about 10 mol percent. A particularly favorable action is obtained if these two structural units are present in the compounds of the invention in approximately a mol ratio of 1:1.

There can be present in the compounds of the invention further structural units or building blocks, the amount of which, however, should be such that the water solubility of the compounds or that of their alkali metal or alkaline earth metal salts is retained. In case of the incorporation of hydrophobic units, for example of a low methacrylate, the amount thereof should not exceed 20% by weight.

In general it can be stated that the agglomerating effect of those compounds having calcium salts which are also soluble is particularly good as shown hereinafter. In order to check this last mentioned property, 10 cc. of a 0.5% aqueous alkaline salt solution of the compound to be examined is treated with 5 cc. of a 0.5% calcium chloride solution. The compounds which form a precipitate in this connection have a poorer effect with respect to their agglomerating action than those compounds which do not give any precipitate. Among compounds of similar structure, those macro-molecular compounds are particularly effective which have an average molecular weight of more than 300,000.

Compounds of the above described type can be produced, for example, by saponifying polymethacrylates or copolymers consisting predominantly of a methacrylate or methacrylates with caustic alkalies and ammonia, or compounds which split off ammonia, or amines, at temperatures above 180° C. Another way of preparing these copolymers consists in copolymerizing methacrylic acid and methacrylamide in the known manner and heating the products obtained, for example, at 180° C. for four hours. Cyclization occurs with the splitting off of ammonia and water, thus forming the dimethacryloylimide ring units within the linear macro-molecular compound.

The fact that ring closure occurs both in connection with the saponification of polymethacrylates and in the heating of copolymers formed from methacrylic acid and methacrylamide, and that therefore macro-molecular compounds whose molecules are constructed of methacrylic acid units and cyclized dimethacryloylimide units and possibly of another structural unit are thereby produced, is proven by the following analytical results:

(a) *Saponification Method*

Polymethylmethacrylate (average molecular weight 1,600,000) was saponified with 0.5 equivalent of sodium hydroxide and 0.5 equivalent of aqueous ammonia for 7 hours at 220° C. under pressure and with simultaneous agitation.

The yellowish-brown, highly viscous product produced thereby was diluted with water to a solids content of 1% and introduced in this form into 5% hydrochloric acid while stirring. A yellowish-white, fiber-like product precipitated, which after filtering and repeated washing with hot water and acetone, was dried to contant weight. The ashfree product had an acid number of 305, a methoxyl content of 0.24%, a carbon content of 55.23%, a hydrogen content of 7.03%, and a nitrogen content of 3.92%. The determination of the included water by the Fischer method showed a water content of 5.60%.

The following composition was calculated from the analyses: 44.00% by weight dimethacryloylimide, 48.0% by weight methacrylic acid, 1.00% by weight unsaponified methylmethacrylate, and 7.00% by weight water.

The following theoretical values apply for a compound of the above composition: carbon, 55.00%; hydrogen, 7.37%; nitrogen, 3.92%; and acid number, 305.

The partial chemical equation for the preparation of the macro-molecular compounds of the invention by this saponification method is as follows:

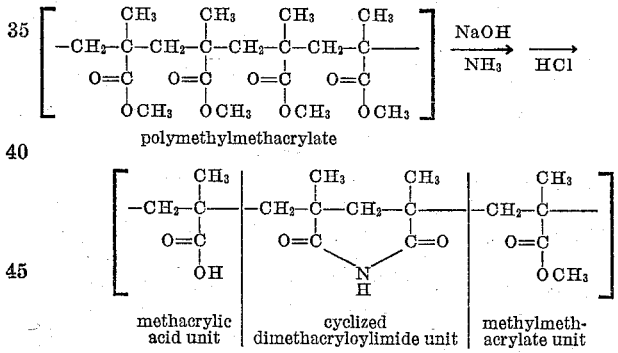

(b) *Copolymerization Method*

70% by weight methacrylic acid and 30% by weight methacrylamide were copolymerized with the addition of 0.5% by weight potassium persulfate in 20% aqueous solution.

The white, granular copolymer was washed with water and dried to constant weight in vacuum at 50° C. Thereupon the product was heated at 180° C. for 4 hours and the ammonia which was liberated in this connection was determined qualitatively (Litmus). The heated product had a slightly yellow color.

The analysis gave the following values: acid number, 352; carbon, 58.00%; hydrogen, 7.23%; and nitrogen, 5.45%.

There corresponds to this composition a compound of 54.1% methacrylic acid, 17.0% methacrylamide, and 28.9% dimethacryloylimide.

The partial chemical equation for the preparation of the macro-molecular compounds of the invention by this copolymerization method is as follows:

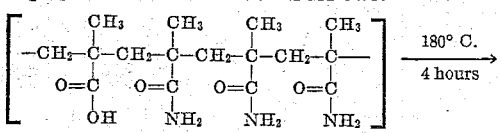

Copolymer of methacrylic acid and methacrylamide

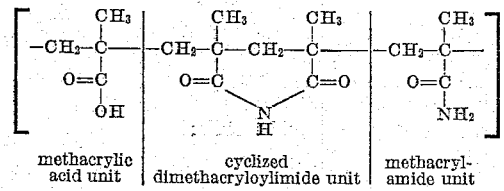

| methacrylic acid unit | cyclized dimethacryloylimide unit | methacrylamide unit |

Since the product is water-soluble as an alkali or ammonium salt, a possible intrinsic cross-linking is eliminated.

The agglomerating action of the copolymer produced from methacrylic acid and methacrylamide and the agglomerating action of the cyclized product produced therefrom by heating were determined in the manner described below (Yoder test). In the former case, it amounted to 6.0 grams and in the latter case there was an increase to 30.5 grams; in other words, the agglomerating action rose by more than five times as a result of the heating.

The following comparisons, A and B, clearly show that the compounds of the invention are far superior with respect to their agglomerating action to the products heretofore known for the same purpose, particularly when very small proportions are used, for example about 0.01% to about 0.05% by weight as a soil improving agent, or quantities of for example 1 gram per cubic meter of suspension for the clarification of suspensions.

(A) Copolymers 1 to 3 proposed heretofore as agglomerating agents are compared below with compounds 4 to 7 of the present invention:

Copolymer 1 was the calcium salt of a vinylacetate-maleic acid copolymer prepared in accordance with German Patent No. 893,345, Example 1, Sample 14.

Copolymer 2 was formed from 65% methacrylic acid, 25% methylmethacrylate and 10% acrylonitrile.

Copolymer 3 was formed from equal molar proportions of methacrylic acid and methacrylamide.

Compound 4 was prepared as was copolymer 3 but it was cyclized by subsequently heating it at 180° C.

Compound 5 was prepared from a copolymer formed from 30 mol percent methacrylamide and 70 mol percent methacrylic acid by heating it to 190° C.

Compound 6 was obtained by saponifying polymethylmethacrylate (average molecular weight 1,500,000) with 0.7 equivalent of sodium hydroxide and 0.3 equivalent of aqueous ammonia at 220° C.

Compound 7 was prepared by saponifying polymethylmethacrylate (average molecular weight 1,200,000) with 0.25 equivalent of soda and 0.3 equivalent of aqueous ammonia.

The agglomerating action of these materials was determined by means of the Yoder test which is a standard test for the determination of the quality of soil improving agents and has been described in the Journal Americ. Soc. Agron., 28, pages 337–351.

Portions of 500 grams of a soil having a particle size up to 0.4 mm. and consisting of 50 parts garden earth, 30 parts clay and 20 parts sand were moistened with 160 grams of an aqueous solution of 0.25 gram of the alkali or calcium salt of these materials and after uniform initial drying brought to a particle size of 0.4 to 4 mm. In accordance with the instructions for carrying out the Yoder test, the residue of a weighed portion of 50 grams each which remains between the shaking screens and was dried to constant weight at 100° C. was determined. These quantities of residue, set forth in the following table, constitute a measure of the intensity of the agglomeration of the soil. When carrying out the Yoder test on the untreated soil, the screen residues was 0.11 gram.

| Copolymer or Compound | Residue in grams (Yoder Test) | Precipitability with Ca++ |
|---|---|---|
| 1 | 14.0 | — |
| 2 | 14.5 | — |
| 3 | 17.5 | — |
| 4 | 35.5 | — |
| 5 | 30.0 | — |
| 6 | 25.5 | + |
| 7 | 33.5 | — |

(B) The following comparison shows that the compounds of the invention effect the clarification of turbid liquids more completely or in considerably smaller quantities than do the polyelectrolytes already known for the same purpose. According to German Patent No. 931,591, turbid inorganic salt solutions are clarified by adding to the turbid liquids polymerization products which form polyions, for example the salt of a copolymer consisting of vinylacetate and maleic acid. The following compounds of the invention are compared with such a copolymer 1 consisting of equal molar parts of vinylacetate and maleic acid and used in the form of its sodium salt:

Compound 2 was prepared by saponifying polymethylmethacrylate (average molecular weight 1,400,000) with 0.5 equivalent of sodium hydroxide and 0.5 equivalent of aqueous ammonia at 230° C.

Compound 3 was prepared by saponifying polyethylmethacrylate (average molecular weight 800,000) with 0.7 equivalent of sodium hydroxide, 0.2 equivalent of aqueous ammonia and 0.1 equivalent of monomethylamine at 210° C.

Compounds 2 and 3 of the invention were compared in the following manner with copolymer 1 already known as a sedimentation agent:

A crude potassium salt solution saturated at 90° C. which was rendered strongly turbid by clay and anhydrite required the addition of 4.0 grams of copolymer 1 per cubic meter of suspension in order to be clarified within one minute to such an extent that the supernatant salt solution was clear. When using compounds 2 and 3, the same effect was obtained with the addition of 0.05 gram in one case (compound 2) and 0.10 gram in the other case (compound 3); in other words, the effectiveness of the compounds of the invention exceeds that of a copolymer known heretofore for the same purpose by 80 to 40 times.

Polyelectrolytes are already used for the clarification of raw sugar juices, i.e., for the sedimentation and easier filtration of the suspended calcium carbonate portions. For example, the calcium-sodium mixed salt of a copolymer of maleic anhydride and vinylacetate (molar ratio 1:1) is recommended for the treatment of sugar beet juices. Such a product was compared below with compound 2 of the invention. By adding 3 grams of the copolymer known for this purpose per cubic meter of scum juice at 76° C. and at a pH of 10.6 the sedimentation rate was improved by 30% and the filtration rate by 20%. When the same quantity of compound 2 was used, the sedimentation rate was increased by 70% to 80% and the filtration rate by 40%.

It will be appreciated that the present invention may be modified by those skilled in the art without departing from the spirit thereof and accordingly the invention is to be limited only within the scope of the appended claims.

We claim:

1. An agglomerating agent comprising a water-soluble linear resinous macro-molecular polymer selected from the group consisting of (1) a compound whose molecules are constructed of from about 10 to about 75 mol percent of cyclized dimethacryloylimide units per molecule having the structure

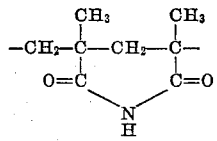

from about 25 to about 90 mol percent of methacrylic acid units per molecule having the structure

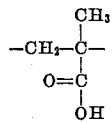

and from 0 to about 20% by weight of units selected from the group consisting of (a) methylmethacrylate units having the structure

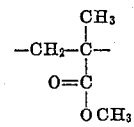

and (b) methacrylamide units having the structure

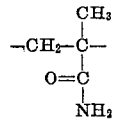

(2) the alkali metal salts thereof and (3) alkaline earth metal salts thereof; the units being attached to one another by carbon-to-carbon linkages.

2. An agglomerating agent as set forth in claim 1 wherein the mol ratio of cyclized dimethacryloylimide units per molecule to methacrylic acid units per molecule is about 1:1.

3. The process of agglomerating soil comprising adding to soil from about 0.01% to about 0.05% by weight of a water-soluble linear resinous macro-molecular compound defined by claim 1.

4. The process of agglomerating soil comprising adding to soil from about 0.01% to about 0.05% by weight of a water-soluble linear resinous macro-molecular polymer defined by claim 2.

5. The process of clarifying aqueous suspensions comprising adding to a turbid aqueous suspension of finely divided solids from about 0.05 gram to about 3 grams per cubic meter of the suspension of a water-soluble linear resinous macro-molecular compound defined by claim 1.

6. The process of clarifying aqueous suspensions comprising adding to a turbid aqueous suspension of finely divided solids from about 0.05 gram to about 3 grams per cubic meter of the suspension of a water-soluble linear resinous macro-molecular polymer defined by claim 2.

References Cited in the file of this patent

UNITED STATES PATENTS

| | | |
|---|---|---|
| 2,146,209 | Graves | Feb. 7, 1939 |
| 2,244,703 | Hubbuch | June 10, 1941 |
| 2,289,540 | Dittmar et al. | July 14, 1942 |
| 2,313,565 | McDowell et al. | Mar. 9, 1943 |
| 2,476,527 | Barnes et al. | July 19, 1949 |
| 2,801,985 | Roth | Aug. 6, 1957 |
| 2,816,083 | Shearer | Dec. 10, 1957 |
| 2,921,928 | Fields et al. | Jan. 19, 1960 |

FOREIGN PATENTS

| | | |
|---|---|---|
| 728,605 | Great Britain | Apr. 20, 1955 |
| 932,700 | Germany | Sept. 8, 1955 |

OTHER REFERENCES

Schildknecht: Vinyl and Related Polymers, pages 299–306, John Wiley (1952). (Copy in Scientific Library; Div. 60.)

The Van Nostrand's Chemist's Dictionary, pages 549–550, D. Van Nostrand (1953). (Copy in Scientific Library; Div. 60.)

C.F. Chem. Abstracts, vol. 50, page 12535c (1956). (Copy in Scientific Library.)